United States Patent [19]

Capitani et al.

[11] 4,412,923

[45] Nov. 1, 1983

[54] PROCESS AND APPARATUS FOR EXTRACTING IONS FROM A CLEAR LIQUID OR A LIQUID CONTAINING MATERIALS IN SUSPENSION BY CONTACT WITH AN EXCHANGE SUBSTANCE

[75] Inventors: Enzo Capitani, Saignes; Jean Teissie, Chamarande, both of France

[73] Assignee: Societe Centrale de l'Uranium et des Minerais et Metaux Radioactifs Scumra, Paris, France

[21] Appl. No.: 353,169

[22] Filed: Mar. 1, 1982

[30] Foreign Application Priority Data

Mar. 5, 1981 [FR] France .................................. 81 04900

[51] Int. Cl.³ ............................................ B01J 47/10
[52] U.S. Cl. ..................................... 210/661; 210/676; 210/189; 210/268; 210/285; 210/512.1
[58] Field of Search ............... 210/661, 669, 676, 788, 210/806, 189, 266, 268, 286, 512.1, 285

[56] References Cited

U.S. PATENT DOCUMENTS

| | | | |
|---|---|---|---|
| 2,742,381 | 4/1956 | Weiss et al. | 210/661 |
| 3,433,362 | 3/1969 | Robinson | 210/512.1 |
| 3,551,118 | 12/1970 | Cloete et al. | 210/661 |
| 4,035,292 | 7/1977 | Himsley | 210/676 |

*Primary Examiner*—Ivars C. Cintins

*Attorney, Agent, or Firm*—Dennison, Meserole, Pollack & Scheiner

[57] ABSTRACT

The present invention relates to a process and an apparatus for continuously extracting ions from a clear liquid or a liquid containing materials in suspension, by means of a bed of grains of exchange substances.

The process comprises maintaining the bed in a permanent condition of fluidization by an absolutely continuous feed of liquid, and subjecting the bed to cyclic pulsation phenomena in such a way as to ensure grading of the grains on the basis of density, in dependence on their ion charge. To carry out that process, an apparatus comprises a fluidization column which does not have any plate capable of interfering with the grading operation, a pulsation generator which operates by taking off liquid at the top of the column and re-injecting it in a surge manner at the base of the bed, and a system for centrifuging the liquid to be treated, for removing the sandy materials therefrom.

This process and apparatus are used when there is a wish to extract any type of anions or cations or exchangeable salts, in an absolutely continuous mode of operation, from clear liquids or liquids containing materials in suspension, by means of mineral exchange substances or resins, to avoid the problems of clogging and abrasion, and to achieve the maximum extraction capacity and rate.

7 Claims, 2 Drawing Figures

PROCESS AND APPARATUS FOR EXTRACTING IONS FROM A CLEAR LIQUID OR A LIQUID CONTAINING MATERIALS IN SUSPENSION BY CONTACT WITH AN EXCHANGE SUBSTANCE

The present invention concerns a process and an apparatus for extracting ions from a clear liquid or a liquid containing materials in suspension by contact with an exchange substance.

The man skilled in the art knows that, in regard to material transfer, the ions which are present in a liquid can be reversibly and stoichiometrically exchanged by means of substances having mobile anions or cations and referred to as ion exchange substances. In the solid state, such substances comprise mineral or organic compounds which are generally in the form of grains or balls of dimensions suited to the use envisaged.

With the exchange reaction being balanced, in order to achieve a suitable transfer rate, it is necessary to provide for relative movement between the exchange grains and the liquid. Hence, the development of processes and apparatuses for making one or other of the materials involved, or even both materials, movable. The most conventional method for this purpose comprises passing the liquid through a fixed bed of grains contained in a column. It is used in particular for the demineralisation of water, but it can be employed only if the liquid to be treated is perfectly clear because, in fact, if the liquid contains solid particles in a state of suspension, as is the case with a pulp, the solid particles are stopped by the grains and cause the bed to become clogged, after a shorter or longer period of time has elapsed. In addition, when the grains reach their maximum extraction capacity, they have to be treated in order to recover the ions which are fixed thereon and the grains have to be regenerated before being re-used; this requires a certain time and therefore, if there is a need to have a continuously operating installation, it is thus necessary to provide at least two extraction columns, which is not an attractive proposition from the economic point of view.

It is for this reason that researchers have applied their ingenuity in developing methods by means of which it is possible to operate the exchange process more or less continuously with a single column, and they have directed their attention towards mobile beds, that is to say, systems in which not only the liquid but also the exchange grains are set in movement with respect to the wall of the column containing them.

These methods are divided into two groups:
  in one group, the bed is referred to as compacted because the movement is produced by a succession of movements, each involving a smaller or larger amount of grains, and
  in the other, the bed is referred to as fluidised as the grains behave like a fluid and all move in accordance with the same speed cycle.

In the latter group, reference may be made to the process disclosed by U.S. Pat. No. 4,035,292, which comprises fluidising the grains by means of the liquid to be treated in a column comprising a series of superposed chambers in which the ion transfer operation is effected; the exchange substance is moved from one chamber to the chamber which is disposed immediately below, while diverting a part of the liquid flow outside of the column; thus, the grains which are more or less highly charged with ions are recovered in the lower part of the column and discharged to a regeneration system. This process is also found in U.S. Pat. No. 3,738,814, but with the difference that the grains pass from one compartment of the column to another by stopping the circulation of liquid and even by reversing the direction of circulation.

Therefore, these various methods use columns containing plates, and movement of the grains downwardly in the column is effected by cyclically stopping fluidisation, either by diverting a part of the liquid flow or by stopping the liquid flow or by reversing the direction of propagation of the liquid. In other methods, a liquid purge operation is carried out at the bottom of the column, in which case a grating or grid must be provided to prevent the grains from escaping from the column.

If all these methods provide substantial improvements in comparison with fixed beds, nonetheless they suffer from a number of disadvantages. Thus, cyclically stopping the fluidisation effect reduces the fixing duration of the exchange substances, thereby reducing the level of efficiency of the column; it is also necessary to provide the installation with a series of automatic valves which open in accordance with a program, and controlling the valves by electronic or electromagnetic actuating means is complex and expensive. In addition, the actuation of such assemblies requires careful and delicate monitoring of the flow of liquid in order to remain within the limits in respect of fluidisation and in order not to cause grains to be entrained out of the column, which would result in an inadmissible loss.

In addition, the presence of plates which are intended to form the compartments or the chambers, and likewise the grids which support the grains, form points at which the material can become caught up and therefore constitute sources of blockage phenomena, particularly when treating pulps which are more or less highly charged with clays which bind to the grains.

It should be added that, in such installations, there is nothing to prevent the pulp entraining sandy materials which cause wear at the support grids and grain abrasion, resulting in losses due to "fly-away", and also an increase in the risk of blockage occurring.

It is for this reason that the present applicants, being aware of the difficulties involved in using such methods, sought and developed a process and an apparatus of great simplicity, using a single column in which the bed is maintained in a permanent condition of fluidisation, with recovery of the ion-charged grains being effected continuously when the ion charge has reached an optimum level, and in which the clogging, abrasion, wear and grain entrainment phenomena are greatly reduced.

These are advantages which make it possible to carry out an extraction operation which is in actual fact continuous, and which therefore makes it possible to provide the maximum treatment capacity, while maintaining the plant in good working condition.

This process which comprises continuously extracting the ions from a clear liquid or a liquid containing materials in suspension by means of a bed of grains of exchange substances, which is fluidised within a column by circulation of the liquid, is characterised in that said bed is subjected to cyclic pulsation effects so as to produce grading of the grains in respect to density.

It is known that the grains of exchange substances are of a density which increases in dependence on the amount of ions fixed, and it may be thought that, when they are fluidised, the result will be sedimentation with increasing density, downwardly in the column. In fact, this is not the case as the grains are generally close to each other, which impedes the grading effect and results in the presence of light grains, which are referred to as "stray" grains, mixed with the heavy grains. In order to reduce that phenomenon, it is possible for plates apertured with small orifices to be placed within the column, and to effect the grading step by stopping the fluidisation effect or reversing the direction of circulation of the liquid, but that mode of operation then again encounters the working disadvantages already referred to above.

In the course of their research, the applicants found that grading of the grains could be effected more rapidly and more completely, by subjecting the fluidised bed to cyclic pulsation effects produced by rapidly and periodically introducing in the lower part of the bed, an amount of liquid which is initially taken off in the upper part of the column. Each intake of liquid has the effect of producing an abrupt upward elevational movement of liquid, thus causing a rising movement of the grains, with the rising movement being in direct proportion to the lightness of the grains. During the periods of stoppage which are interposed between the liquid intake periods, that phenomenon is accentuated since the heaviest grains then move downwardly more quickly.

Unlike the prior art methods, grading which is effected in this manner occurs even when the bed is maintained in a permanent condition of fluidisation, and therefore provides the possibility of having a feed flow of liquid to be treated, which is absolutely continuous and at constant speed. This has the advantage of preventing the grains from being entrained out of the column by the liquid, which is an inevitable phenomenon when the column operates with an irregular feed flow.

Such a grading effect also occurs in the absence of any plate or grain support member with which the prior-art columns had to be equipped so that the process according to the invention is also characterized in that the bed is continuous within the column and can move freely within itself. This avoids clogging phenomena and the repercussions thereof, such as the formation at certain points in the column of variable pressure drops which result in preferential paths of movement.

The effect of the grading step as performed is to position the densest grains, that is to say, those which have fixed the greatest amount of ions to be extracted, in the lower part of the bed. They can therefore be removed at that location, with the certainty that they have all made maximum use of their exchange capacity. This contributes to the process having a very high level of efficiency and a very high treatment capacity, unlike the prior-art processes in which the operation of removing the ions-charged grains was carried out on a mixture of grains which were charged to a greater or lesser degree.

Such a grain removal operation can be carried out continuously, without interfering with the feed flow of the column.

Another feature of the process according to the invention is that it is applied to liquids containing not only materials in suspension but also sandy particles, as is the case with most industrial pulps. It is known that such materials cause abrasion phenomena at the grains of exchange substances. The applicants have overcome this problem by locally subjecting the liquid feeding the column to a centrifugal force in its path of movement, before it reaches the lower level of the bed. The centrifuging effect may be produced either within the columm itself or in the feed pipe system. In the former case, the sandy materials may be discharged continuously at the base of the column. Thus, these undesirable substances are continuously removed from the liquid without having recourse to a preliminary treatment and moreover without interfering with fluidisation.

The present invention also concerns an apparatus for carrying out the above-described process. This apparatus which conventionally comprises a vertical cylindrical column containing the bed over a part of its height, which is provided at its lower end with an end portion which is closed in its lower part and which is provided with a pipe system for the feed of liquid to be treated and, at its upper end, with means for introducing the regenerated exchange substance and for discharge of the treated liquid, is characterised in that the column is without accessory means such as plates or grids capable of obstructing the grain grading effect, that it is internally provided with means for stabilising the stream of liquid and is provided on its side wall with two tapping means communicating with a cyclic pulsation generator, which open into the liquid, one at the top above the bed and the other at the bottom within the bed, that the end portion is conical and is provided, on its side wall, with a system for taking off the densest exchange grains.

Thus, in an original fashion, the column does not include any plate which in the prior art and in combination with an interruption in the fluidisation operation, made it possible to effect a certain degree of grading of the grains.

In addition, there is no support grid for the grains, the grains being deposited in the end portion of the column in the event of the installation being voluntarily stopped and being easily returned into a state of suspension by resuming the liquid feed.

The column only comprises in its interior means for stabilising streams of liquid, formed by discs which have therein openings of large dimensions, which do not prevent gravity and the pulsation phenomena from freely applying their effects to the grains.

On its side wall, the column is provided with two tapping means for connection to a pulsation generator, with one being disposed at the top, above the bed, and the other at the bottom, at the level of the bed. The tapping means respectively permit on the one hand an amount of clear liquid which floats above the bed to be taken off and, on the other hand, permit that liquid to be re-injected into the bed so as to be able to produce the cyclic pulsation effect.

The tapping means open vertically within the column, the upper tapping means being directed downwardly and the lower tapping means being directed upwardly, preferably, on the axial centre line of the column, and by way of a conical distributor and a deflector, so as to propagate the pulsation movement over the entire section of the column. Any generating means capable of creating cyclic pulsation phenomena by transfer of liquid between the two tapping means may be suitably used in the invention.

The apparatus is also characterised in that, at its lower end, the column is provided with a conical end portion which, on its side wall, is provided with a system for taking off the densest grains. In fact, by providing a cone at the bottom of the column, the result is the creation of a region in which the liquid flow section is smaller with the result that the speed of circulation is higher than the mean speed in the cylindrical part of the column; the grains are then subjected to a higher thrust force than in the column itself and in this way the lower part of the bed is stabilised, at a certain level. It is in this region that the grains which are most highly charged with ions accumulate, under the effect of the pulsation phenomena, and it is in this region also that the grain extraction system is disposed. The grain extraction system is formed by a tapping means which is externally connected to a calibrated valve which allows the grains to pass continuously or rhythmically, and to a transfer system which passes the grains to a regeneration station before they are re-introduced at the top of the column to carry out a fresh extraction cycle.

The apparatus according to the invention is also characterised by a particular pulsation generator comprising a vertical tube whose height is close to that of the bed and which is closed at its lower end, being connected at its upper end to a system for bringing it alternately and for a controlled period into communication with a pressure gas source or with atmosphere, and which is also provided, on its side wall, with two tapping means communicating with the lateral tapping means of the column by way of non-return valves so disposed as to be able to cause an upward movement in the column, using a fraction of the liquid circulating in the column.

The mode of operation of the above-described generator is as follows:

With the tube being filled with liquid to a level corresponding to the upper level of liquid in the column, air is introduced under pressure in the upper part of the tube. Under the effect of that pressure, the valve which is on the upper tapping means is closed while the other opens and allows the liquid to flow into the column, causing a pulsation effect which is propagated over the entire height of the bed; a control mechanism then closes the compressed air intake valve and opens a valve for communication with the air; the non-return valves move into their opposite positions and the liquid in the column flows through the upper tapping means to the tube until the levels are balanced, and the cycle resumes.

In this way, there is no disturbance affecting the regularity of fluidisation in the column and the constancy of the liquid flow.

A particularity of the present invention is to avoid the phenomena of the exchange grains being abraded by the sandy materials which generally accompany pulps. For that purpose, the liquid to be treated is locally subjected to a centrifugal force. This is effected in an original manner by extending the conical end portion downwardly by a cylindrical portion which is closed at its upper end by a partitioning wall which is apertured in its centre with an opening to which there is fitted a pipe portion which is extended downwardly over at least a third of the height of the cylinder and which communicates with the conical portion by way of a non-return valve which is disposed on said pipe, for preventing resin from moving down in the event of a stoppage; the pipe for supplying the liquid to be treated is fixed on said cylinder tangentially to the wall and in a direction perpendicular to the axis of the column.

This arrangement therefore provides a centrifugal separator which is integrated in the column itself, and in which the liquid is displaced with a rotary movement during which, under the action of centrifugal force, sandy materials are directed towards the wall and move downwardly of the column, while the purified liquid moves towards the column by way of the central pipe.

The sandy material may be discharged continuously or discontinuously by means of a cone disposed below the cylinder, with the apex of the cone being provided with an orifice and a control valve.

In an alternative form, the centrifugal separator may be disposed on a pipe for the supply of liquid to be treated, upstream of the cylindrical part of the end portion.

The invention will be better appreciated by reference to the accompanying drawings in which.

Figures 1, 2:
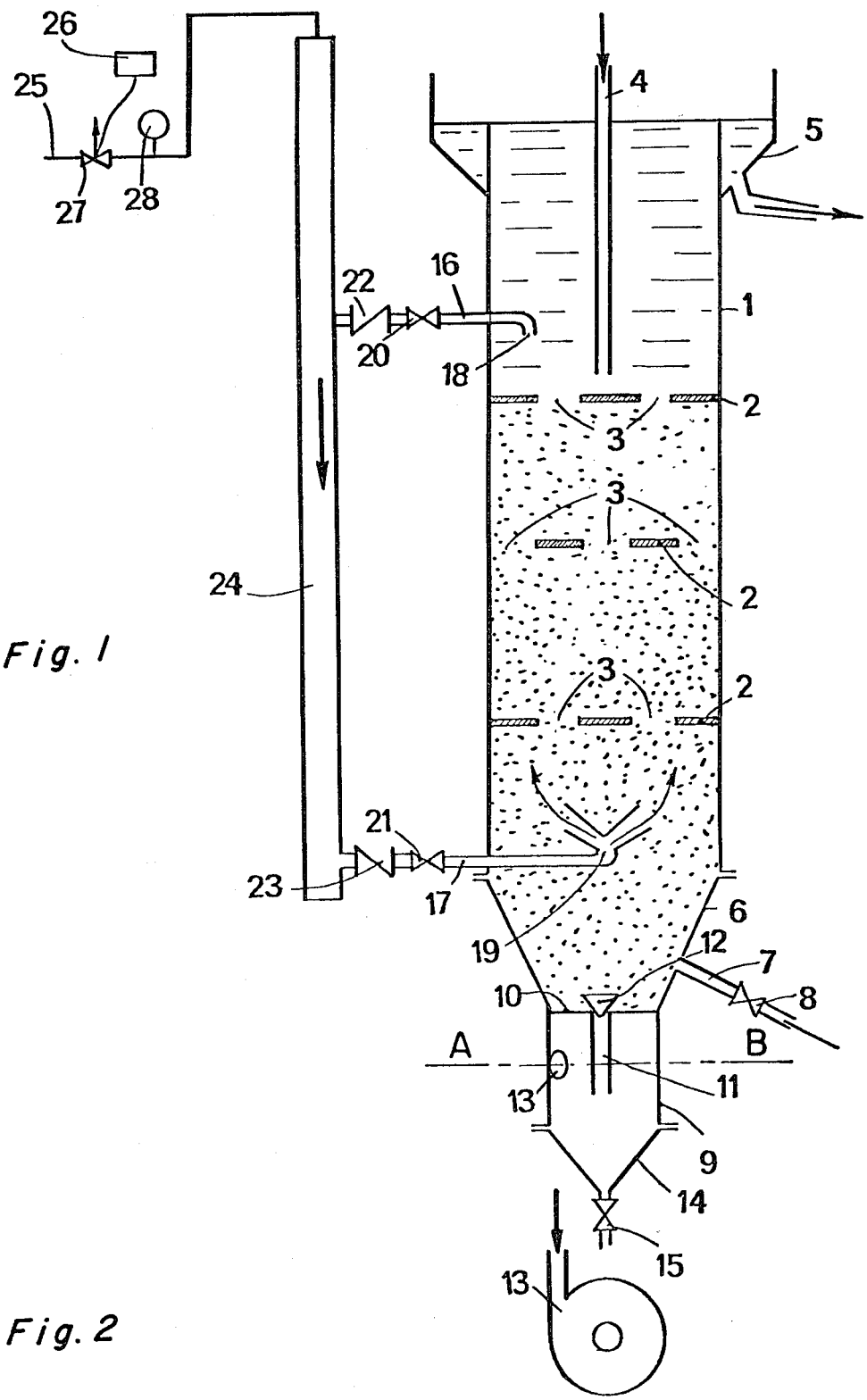
FIG. 1 shows a view in vertical section of the whole of the apparatus.
FIG. 2 shows a view in cross-section perpendicular to the axis of the column, at the level of the feed pipe.

Referring to FIG. 1, shown therein is a cylindrical column 1 containing three discs 2 for stabilising streams of liquid, which have apertures 3 disposed in a staggered arrangement relative to each other. The upper end of the column is provided with a pipe 4 for the feed of regenerated exchange grains and a collar arrangement 5 at which the treated liquid is removed by overflow. The lower end of the column is provided with a conical end portion 6, to the side wall of which is fixed a pipe 7 and a valve 8 for removing the exchange grains which are charged with ions to be extracted. The end portion 6 is extended downwardly by a cylindrical portion 9 which is separated from the conical portion by a partitioning wall 10 having an aperture communicating with a pipe portion 11 on which there is a non-return valve 12. The pipe 13 for the feed of liquid to be treated is fixed tangentially to the side wall of the cylindrical portion. The cylindrical portion is closed at its lower end by a cone portion 14, at the apex of which is provided a valve 15.

The column has two lateral tapping means 16 and 17 which respectively open into the liquid at 18 and at the base of the bed by way of a conical distributor 19 and a deflector. Disposed on the two tapping means 16 and 17 are valves 20 and 21 and non-return valves 22 and 23 which are connected to the pulsation generator which is formed by a vertical tube 24 which is closed at its lower end and connected at its upper end to a compressed air source 25, the flow of compressed air being controlled by a control arrangement 26 which acts on the three-way valve 27 for communicating it either with the source, or with atmosphere, while the cycle thereof can be followed by means of a pressure gauge 28.

In operation, the regenerated grains are continuously introduced into the column by way of the pipe 4 and fluidised by the circulation of liquid to be treated from the feed means 13. As it passes into the cylindrical portion 9, the liquid gives up the sandy materials which are deposited at 14 and then the ions to be extracted which are fixed to the grains of the bed which in the condition of equilibrium is delimited in an upward direction by the level of the highest stabilising means and in a downward direction by a surface which is disposed approximately at the level of the pipe 7. The liquid continues its rising movement in the column, with the grains having been removed therefrom, and issues from the column at the level of the arrangement 5. Periodically, the control arrangement 26 connects the tube 24 to the compressed air source, which has the effect, when the valve 23 is opened, of causing a downward movement of the liquid which it contains towards the deflector 19 and the creation of a pulsation effect within the column; then, the tube is communicated with atmosphere, which, under the effect of the hydrostatic pressure applied by the liquid of the column at the level of the pipe 18, causes opening of the non-return valve 22 and the introduction of liquid into the tube 24, to a height corresponding to that of the arrangement 5.

The invention will now be illustrated by reference to an example of use thereof.

The column used is 1.5 m in diameter and 10 m in height. Internally, the column is provided with three stabilising means having holes which are 0.30 m in diameter while at its base the column has a cylindrical-conical end portion which is 1.85 m in height. The column is provided with two lateral tapping means, one of which is disposed in the lower part of the column while the other is spaced at a distance of 8.3 m, both said tapping means being fixed to a generator capable of producing 1200 pulsations per hour, in the course of which pulsations 3.5 l of liquid is introduced on each occasion, in one second. The column contains 6.5 m³ of resin of sulphonated polystyrene type, with a grain size of 0.8 mm, occupying a height of 6.65 m, in the fluidised condition.

30 m³/h of a pulp containing 0.325 g/l of uranium in the form of uranyl sulphate in solution and 48 g/l of materials in suspension, being less than 85 μm in size, is introduced into the column.

The grains which are removed at a rate of 0.410 m³/h contained 28 g of uranium per liter and the pulp, at the discharge from the column, then only titrated 0.004 g/l.

The present invention is used when there is a requirement to extract any type of anions or cations or exchangeable salts, in an absolutely continuous mode of operation, from clear liquids or liquids containing materials in suspension, by means of mineral exchangers or resins, to avoid the problems of clogging and abrasion, and to achieve the maximum extraction capacity and rate.

What is claimed is:

1. A process for continuous ion exchange between a liquid and a mobile bed of grains of ion exchange substances disposed in a vertical column and comprising the steps of:

continuously introducing liquid to be treated into the lower end of the column and upwardly through the bed to continuously maintain the grains in a fluidized state;

introducing regenerated grains of the ion exchange substances into the upper end of the column to maintain the bed with generally downward movement of the grains in countercurrent flow relation to the upward movement of the liquid;

subjecting the fluidized bed to cyclic pulsation by withdrawing treated liquid from the upper end of the column and rapidly and continuously periodically introducing the treated liquid upwardly into the lower end of the bed whereby density grading of grains is effected; and continuously removing spent grains from the lower end of the column without interfering with the feed of liquid to be treated.

2. A process according to claim 1 including maintaining the bed within the vertical column as a continuous bed capable of freely moving within the column.

3. An apparatus for carrying forth an ion exchange process which comprises:

a vertical column provided at its lower end with a conical end portion equipped with feeding means for introducing a pressurized liquid to be treated in said column and at its upper end with discharging means for discharging liquid after treatment thereof in said column;

introducing means at the upper end of said column for introducing grains of ion exchange substances and evacuation means in said conical end portion above said feeding means for taking off said grains, whereby in operation the grains form in said column a moving and fluidized bed comprised between said evacuation means and a top level of the grains;

a fluid pulsation generator operatively connected to said vertical column; and communicating means between said pulsation generator and said column for cyclicly continuously introducing pulsed fluid into said column at a level intermediate the level of said evacuation means and said top level of the grains.

4. An apparatus according to claim 3 in which said column includes means for stabilizing streams of liquid comprising a plurality of discs which have large apertures disposed in a staggered arrangement relative to each other.

5. An apparatus according to claim 3, in which said pulsation generator comprises a vertical tube closed at its lower end and connected at its upper end to valve means permitting communication either with a compressed air source or with atmosphere filling pipe means with non-return valve means connecting said vertical tube to said column at a level intermediate the level of said discharging means and said top level for filling said vertical tube with liquid and injection pipe means with non-return valve means connecting said vertical tube to said column at said communication level for injecting liquid into the bed.

6. An apparatus according to claim 3, in which said feeding means comprises feeding pipe means for exerting a centrifugal force on liquid being injected into the bed, and exhaust means being provided below said feeding pipe means for discharge of solids separated by centrifugal force from the liquid to be treated.

7. An apparatus according to claim 6, in which said conical end portion is extended downwardly by a cylindrical portion which is closed at its upper end by a partitioning wall mean which at its center has a through opening to which there is fitted a pipe portion which is extended downwardly over at least a third of the height of said cylindrical portion and which communicates with said conical end portion by way of a non-return valve, said feeding pipe means being fixed on said cylindrical portion tangentially thereto and in a direction perpendicular to the axis of the column, and including at the lower portion of the cylindrical portion a cone, the apex of which is provided with said exhaust means.

* * * * *